US008893011B2

(12) United States Patent
Peters et al.

(10) Patent No.: US 8,893,011 B2
(45) Date of Patent: *Nov. 18, 2014

(54) CHRONOLOGY DISPLAY AND FEATURE FOR ONLINE PRESENTATIONS AND WEBPAGES

(75) Inventors: Keith Peters, San Francisco, CA (US); Bryn Dole, Sunnyvale, CA (US); Robert Torres, San Jose, CA (US)

(73) Assignee: Topix LLC, Palo Alto, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 13/554,719

(22) Filed: Jul. 20, 2012

(65) Prior Publication Data

US 2012/0284629 A1    Nov. 8, 2012

Related U.S. Application Data

(63) Continuation of application No. 11/768,832, filed on Jun. 26, 2007, now Pat. No. 8,250,474.

(60) Provisional application No. 60/909,421, filed on Mar. 31, 2007.

(51) Int. Cl.
| | | |
|---|---|---|
| *G06F 17/30* | (2006.01) | |
| *G06F 3/00* | (2006.01) | |
| *G06F 3/048* | (2013.01) | |
| *H04L 29/08* | (2006.01) | |

(52) U.S. Cl.
CPC .... *G06F 17/30044* (2013.01); *G06F 17/30905* (2013.01); *G06F 17/3005* (2013.01); *G06F 17/30064* (2013.01); *H04L 67/02* (2013.01)

USPC .......... 715/738; 715/772; 715/855; 707/714; 707/737; 707/741

(58) Field of Classification Search
USPC ........................................................ 715/738
See application file for complete search history.

(56) References Cited

U.S. PATENT DOCUMENTS

| | | | |
|---|---|---|---|
| 6,366,933 B1 * | 4/2002 | Ball et al. ...................... 715/203 |
| 6,600,501 B1 | 7/2003 | Israel et al. | |
| 6,606,657 B1 | 8/2003 | Zilberstein et al. | |
| 7,296,232 B1 | 11/2007 | Burdick et al. | |
| 7,441,194 B2 | 10/2008 | Vronay et al. | |
| 8,682,826 B2 * | 3/2014 | Dolan et al. ..................... 706/45 |
| 2003/0101261 A1 | 5/2003 | Ikeda et al. | |
| 2003/0140044 A1 * | 7/2003 | Mok et al. ....................... 707/10 |
| 2005/0055625 A1 | 3/2005 | Kloss | |

(Continued)

OTHER PUBLICATIONS

Non-Final Office Action mailed Apr. 27, 2010 in U.S. Appl. No. 11/768,832.

(Continued)

*Primary Examiner* — Dino Kujundzic

(74) *Attorney, Agent, or Firm* — Mahamedi Paradice LLP

(57) ABSTRACT

A chronology display is generated for use with a web presentation or other form of network presentation. The chronology display may include a plurality of intervals, with each interval representative of a period of time. In an embodiment, some of the intervals may indicate a number of content items provided on the network presentation during the time period that corresponds to each particular interval. The indication may be provided by a characteristic, such as for example, a color or shading that represents the number of content items provided on the network presentation.

20 Claims, 7 Drawing Sheets

(56) References Cited

U.S. PATENT DOCUMENTS

| | | | |
|---|---|---|---|
| 2005/0108345 A1* | 5/2005 | Suzuki | 709/206 |
| 2006/0026499 A1 | 2/2006 | Weddle | |
| 2006/0031220 A1* | 2/2006 | Newbold et al. | 707/7 |
| 2006/0168510 A1* | 7/2006 | Bryar et al. | 715/511 |
| 2007/0033169 A1 | 2/2007 | Friedman | |
| 2007/0118498 A1 | 5/2007 | Song et al. | |
| 2007/0203816 A1* | 8/2007 | Costache et al. | 705/35 |
| 2007/0245238 A1 | 10/2007 | Fugitt et al. | |
| 2008/0071929 A1 | 3/2008 | Motte et al. | |
| 2008/0082578 A1 | 4/2008 | Hogue et al. | |
| 2008/0091656 A1 | 4/2008 | Charnock et al. | |
| 2008/0244065 A1 | 10/2008 | Peters et al. | |
| 2008/0270391 A1 | 10/2008 | Newbold et al. | |
| 2009/0070200 A1 | 3/2009 | August | |
| 2009/0100347 A1 | 4/2009 | Schemers et al. | |
| 2009/0150128 A1 | 6/2009 | Zhang et al. | |
| 2009/0220206 A1 | 9/2009 | Kisliakov | |
| 2010/0070485 A1 | 3/2010 | Parsons et al. | |
| 2010/0088322 A1 | 4/2010 | Chowdhury et al. | |
| 2010/0287481 A1 | 11/2010 | Sawada et al. | |
| 2011/0022966 A1 | 1/2011 | Rose et al. | |

OTHER PUBLICATIONS

Non-Final Office Action mailed Jan. 3, 2011 in U.S. Appl. No. 11/768,832.

Final Office Action mailed May 9, 2011 in U.S. Appl. No. 11/768,832.

Notice of Allowance mailed Apr. 24, 2012 in U.S. Appl. No. 11/768,832.

* cited by examiner

| Category/Web Page 410 | Content URL 420 | Content Text 430 | Content Picture 440 | Interval Data 450 |
|---|---|---|---|---|
| Category A | URL 1 | <Text> | <Picture> | Interval 1 |
| Category B | URL 2 | <Text> | <Picture> | Interval 2 |
| Web Page A | URL 3 | <Text> | <Picture> | Interval 3 |
| Presentation A | URL 4 | <Text> | <Picture> | Interval 4 |
| Presentation B | URL 5 | <Text> | <Picture> | Interval 5 |

Data Structure 400

FIG. 4

Web Page 500

Web Page 500

CHRONOLOGY DISPLAY AND FEATURE FOR ONLINE PRESENTATIONS AND WEBPAGES

CROSS-REFERENCE TO RELATED APPLICATIONS

This application is a Continuation of U.S. patent application Ser. No. 11/768,832, filed Jun. 26, 2007, now U.S. Pat. No. 8,250,474 which claims benefit of priority to U.S. Provisional Patent Application No. 60/909,421, filed Mar. 31, 2007; all of the aforementioned priority applications being hereby incorporated by reference in their entirety for all purposes.

TECHNICAL FIELD

The disclosed embodiments relate generally to the field of webpages and online presentations.

BACKGROUND

With the growth of the Internet, web-sites are increasingly providing content such as news, articles, and stories. There are an increasing number of sources for content on the Internet. With this growth, content distribution on the Internet has become disorganized. For example, popular news sites carry redundant news items, so users have little need to visit more than one news source. For a user to receive comprehensive news items of a given topic, such as their local area, the user may have to visit numerous sites and materials. At the same time, a user may find it difficult to find a news item about an obscure category, such as a disease or a hobby. In such cases, users often rely on search sites, such as provided by YAHOO! or GOOGLE to locate content items of interest.

There are web-sites that categorize content for users, but in most cases, the categories are fairly broad and non-specific. For example, the typical news site will provide aggregation of news stories under headings such as World News, U.S. News, Sports, Business etc. The aggregation and categorization of such stories is typically done through some manual intervention. A typical situation is that the story is categorized in a general category at its origin, and then distributed for consumption or display on multiple web-sites. Another situation is that editors provide keywords in a story, or associate the keywords with the stories, so that when someone types a search term at a search site that matches the key word, the story will be presented in the search result.

Some sites provide category-specific content by searching for content that matches a particular search term. Such sites typically rely on the use of search terms to ensure that a particular content item is sufficiently pertinent to a particular category. When content is identified, it is known to belong to a category of the search term.

BRIEF DESCRIPTION OF THE DRAWINGS

FIG. 4 illustrates a data structure for storing data indicative of one or more network locations from which content is procured according to an embodiment of the invention.

DETAILED DESCRIPTION

Overview

Figure 1:
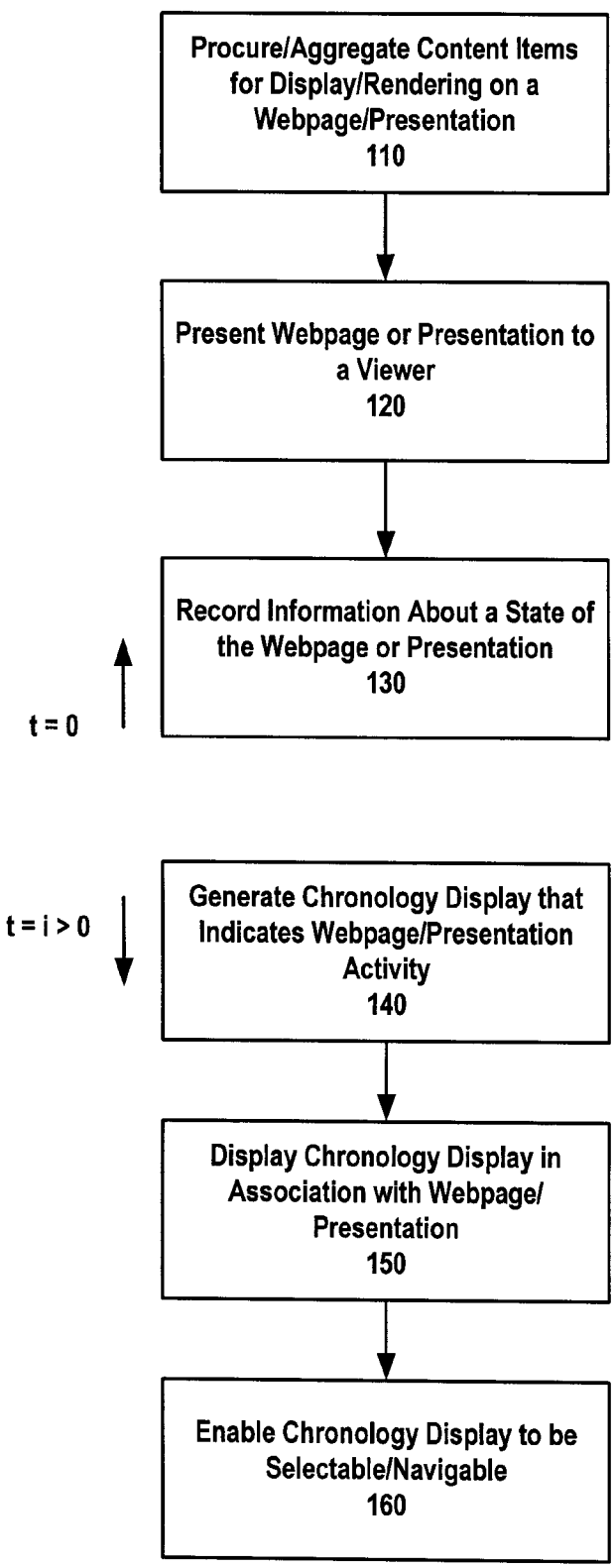
FIG. 1 illustrates a method for programmatically generating a chronology display, reflecting information about the quantity or amount of content displayed on a designated web presentation, under an embodiment of the invention.

Embodiments described provide a system and method for programmatically generating a chronology display displaying the frequency at which a content item, relating to a specified category or topic, was posted or provided on various network locations. As described herein, one or more embodiments enable the use of a chronology display for use with a webpage (or other network presentation) for purpose of displaying a level of activity in which content items are posted or otherwise provided on the webpage.

There are numerous sites and web forums where posted content items signify user-interest level, public trends or current events. For example, a website may programmatically and/or manually procure content items from other network locations and post links or summaries to those content items on web pages that are dedicated to displaying content items by category or topic. In such cases, the number of content items displayed on the webpage may reflect current events. For example, a webpage dedicated to a public personality may post numerous stories in the event the public personality is married, arrested or otherwise "in the news". As another example, some blogs accept content posted by other individuals, and the number of third-party blog entries may correlate to user-interest in a subject of discussion on the blog. Likewise, news stories sometimes enable readers to post comments, and the number of comments posted by individuals may signify the amount of public interest in the story. In each of the examples, a chronology display such as provided with any of the described embodiments enables viewers to view the amount of content items posted or made to appear on the webpage, so as to enable the viewer to understand interest level in the public domain or by users on the site.

According to an embodiment, a chronology display is generated for use with a webpage or other form of network presentation. The chronology display may include a plurality of intervals, with each interval representative of a period of time. In an embodiment, some of the intervals may indicate a number of content items provided on the network presentation during the time period that corresponds to each particular interval. The indication may be provided by a characteristic, such as for example, a color or shading that represents the number of content items provided on the network presentation. As an alternative or addition, the indication may be provided by a numerical value or other character.

In one or more embodiments, the chronology display may include intervals in the form of active links. Selection of an interval may result in the display of content items appearing on the web page in that interval. As such, the chronology display may also provide a tool for viewing archival content of the webpage, or corresponding to the webpage in a previous time period.

A system for displaying online content is also provided. According to an embodiment, the system is made up of one or more modules, including a chronology display module, coupled to an online resource. The chronology display module is configured to identify a number of content items provided on the online resource during a plurality of time periods. Additionally, the chronology display module is configured to generate a chronology display with a plurality of intervals, with each of the plurality of intervals corresponding to one of the plurality of time periods. The intervals may indicate the number of content items provided on the online resource during a time period that corresponds to each particular interval.

In yet another embodiment, a webpage with a chronology display is provided. The chronology display includes a plurality of intervals. The plurality of intervals may indicate a number of content items provided on the webpage during a time period that corresponds to each of the plurality of intervals.

As used herein, the term "content item" means any file, document, or text that can be rendered from an online medium. The term "network presentation" means a webpage, online presentation, a page, or a portion of a page provided in association with a webpage, on which content is presented or provided.

One or more embodiments described herein may be implemented through the use of modules or software/logic components. A module refers to a program, a subroutine, a portion of a program, a software component, firmware or a hardware component capable of performing a stated task or function. A module can exist on a hardware component such as a server independently of other modules, or a module can exist with other modules on the same server or client terminal, or within the same program. A module may be implemented on a client or on a server, or distributed between clients, servers, or amongst a client-server.

Furthermore, one or more embodiments described herein may be implemented through the use of instructions that are executable by one or more processors. These instructions may be carried on a computer-readable medium. Services and components illustrated by figures in this application provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on many cell phones and PDAs), and magnetic memory. A computer-readable medium as used herein may extend across multiple machines. For example, the medium may be distributed between client and server in order to perform a stated task or operation.

Methodology

FIG. 1 illustrates a method for programmatically generating a chronology display, reflecting information about the quantity or amount of content displayed on a web or network presentation, under an embodiment of the invention. The presentation may be in the form of a webpage. One or more embodiments provide that content provided on a webpage is measured in volume or frequency, from which a chronology display is generated. The chronology display reflects the volume or frequency by which content appears or is otherwise assigned to the presentation.

In an embodiment, the presentation is for a webpage that has assigned content. In one embodiment, for example, the webpage is provided for a category, and the assigned content are determined, programmatically or otherwise, as being relevant to the category of the webpage.

Step 110 provides that content items are procured or aggregated for display or rendering on a designated webpage or other presentation. In one embodiment, the content items are procured through a programmatic crawling process, in which various sites and locations on a network are scanned for files and other content items. These content items may be retrieved, and text content from each item may be parsed and analyzed. In one embodiment, the analysis of the text content (e.g. news article, blog post, message etc.) is for the purpose of determining a category of the text content. The designated webpage may be dedicated to displaying articles or other content about a particular category. Based in part on the category determination, a specific text content (or content item) may be assigned to the webpage. Examples of network locations that provide content may include websites or webpages that host or provide (i) news articles or stories, (ii) web logs ("blogs"), (iii) journals, or (iv) message boards with corresponding threads. Alternatively, the content may be procured from a Really Simple Syndication (RSS) feed. Other processes to edit, prune or cull content that is otherwise assigned to a page may also be performed. For example, a selection process may be performed for identifying which of many text content (or content items) to display on one webpage in a given time period, over other text content.

According to one embodiment, content items are assigned to be displayed on webpages based on category determinations. The number of categories that may be provided from a single site may vary. For example, content items procured corresponding to Politics may be in one category, while content items for Law are placed in a second category. In an embodiment, the categorical webpages are updated and maintained so as to correspond to various points of interest. The categories may be broad and relate to general items of interest such as politics, movies, entertainment, news, and sports or any classification of current events or other subjects. The categories may also be more specific and identify a particular athlete, movie, news topic, sporting event or political issue. Categorization of the content items may also be made according to keywords, names, search terms, phrases and other text strings input by a user.

One embodiment provides that the categorization determination for an individual content item is a programmatic process. For example, as content items are procured, text in the content items may be scanned, and various programmatic intelligence techniques may be performed to determine a category assignment for the content item. The techniques may include (i) key word identification, (ii) commonality determination of specific words, phrases or key words, (iii) placement of key words in the text, and (iv) accounting for the source of the content item. Content items may be assigned to more than one category, and thus displayed or rendered concurrently with more than one webpage.

In step 120, the webpage or presentation is made available for display to viewers with its various content items and postings. In one implementation, the webpage may be one of many presentations available at a network location that is hosted with a website domain that maintains numerous such webpages. The content items, or text from the content items, may be provided with the webpage in various forms. For example, content items may be displayed in whole, in part, or otherwise with (i) a link or URL to the website or network location from which the content was procured, and/or (ii) text from the underlying content items, or portions thereof, procured from the network location. A picture and/or a quotation may also be displayed next to the content items provided on the site. Content items may be displayed on the network location according to relevance, with the more relevant subject matter being displayed near the top of the page. Content items may also be displayed according to the time and date each content item was provided on a particular network location, with the most recent postings being displayed first.

In step 130, information about a state of a webpage is recorded. The information may include a count of the content items appearing on the webpage or otherwise provided with the webpage. In this way, the collected information may be assigned to an interval that indicates the number of content items that are displayed or otherwise provided in part or in whole on the webpage. The interval may correspond to a time and/or date. For example, the intervals represent a day, a week, a month, one or more hours of the day, or combinations thereof. Data corresponding to the interval may be stored storage medium and be associated with data corresponding to the category and data indicative of the network location that the content was procured from. In addition, content items posted or displayed on a webpage may also be associated with the corresponding interval. For example, a link or text from the content item may be associated with the interval. Thus one interval may be associated with (i) a count of all content items posted or displayed on the corresponding webpage, and (ii) a link to the content item.

The association of an interval of time and the content items that were posted in the particular time interval may be archived or otherwise stored for future use. For example, as described with an embodiment of FIG. 2, one or more embodiments provide that the chronology display is navigatable and/or selectable to display the webpage, or information based on the state of webpage, at the selected interval.

Step 140 provides for the generation of a chronology display that visually indicates webpage/presentation activity corresponding to one or more of (i) the count or volume of content items provided on a given webpage (or presentation), (ii) the increase or decrease in volume (as compared to a reference or baseline, such as a moving average for the webpage over time), and/or (iii) the frequency by which new content items are assigned to the particular webpage or presentation. While one or more embodiments described above refer to content items that appear on a page in an interval, other embodiments may provide for measurements of when content items were posted to the webpage.

In one embodiment, the chronology display may be divided into a number of different intervals, with each interval displaying data or information ("activity data") indicative of one or more of the measurements of activity. The activity data for each interval may be displayed, for example, as a number, symbol or as text. As an alternative or addition, a color scheme may be used where each interval in the chronology display is color coded, to reflect a measurement of activity. For example, in the case where the presentation is a webpage and the assignments are of category designations, the chronology display of that webpage may include a first interval that displays a color indicating some general number range (e.g. 10-15) of category specific news articles that were posted during the first interval. A second interval may display a second color indicating another range of category specific articles that were posted during the second interval. Thus, for example, the color is indicative of activity measured by a numeric range. For example a yellow colored interval may indicate low activity (e.g. the number of content items posted to the webpage was less than 5), while a red colored interval may indicate high activity (e.g. the number of content items posted to a page was greater than 50). Numerous other colors schemes with associated degrees of activity may also be used to color code the various intervals.

In step 150, the chronology display is displayed on, or otherwise provided in association with, the webpage or presentation in which the assignment of the corresponding content items occurs. The chronology display may be displayed in various spatial locations of a webpage. For example, the chronology display may be displayed at a designated spatial location of the page (e.g. lower right hand portion of the page, upper right hand portion of the page etc.), or the spatial location may be determined on-the-fly in response to available space on the webpage. Alternatively, the chronology display may be presented in dynamic form, such as a floating object, media or "pop up" window. In one implementation, the chronology display may also be hidden and displayed in response to a user action, such as for example, a mouse click, or a hovering pointer over a portion of the page where the chronology display may be hidden from view.

The chronology display may also be combined or hidden with an object, such as an image, icon, link, and/or a text word, the selection of which renders the chronology display to a user. The chronology display may also be minimized and enlarged. If the chronology display is configured to be displayed at a specific location, a user may determine, based on preference, where the chronology display is to appear.

In another embodiment, a chronology display may be displayed when a user selects a link to a content item, such as a news story. For example, a user may select a link corresponding to a particular story on a webpage. When the text content is displayed, a chronology display may be provided that indicates activity levels of content postings or listings on that page.

One or more embodiments provide that in step 160, once the chronology display has been displayed, chronology display may be made selectable and/or navigatable. In an embodiment, a user may actively select an interval on the chronology display that corresponds to a particular date. The selection enables the user to view the information provided on a webpage or presentation, or some information about the state of the page or presentation, on the selected interval or time period. In an embodiment, more than one interval may be selected concurrently. In yet another embodiment, a range of intervals may be selected. For example, a user may specify a particular time frame (e.g. one week, two weeks, one month) or specify a range of dates (e.g. Mar. 1, 2007-Mar. 5, 2007). Still further, one or more embodiments provide that selection of an interval results in the webpage being redisplayed with its content items from the selected interval. In this respect, the webpage may be representative of content items assembled previously in the selected interval, but at the same time different from the current form of the web page. For example, both web pages may be displayed at once in separate windows.

According to an embodiment, steps 110 through 130 may occur at an earlier time, t=0, than steps 140 through 160, that occur at time t=I>0. Therefore, a navigation/selection action with respect to the chronology display enables the viewer to see back in time, as far as postings or content or information about activity on the particular page or presentation where the chronology display is provided.

Figure 2:
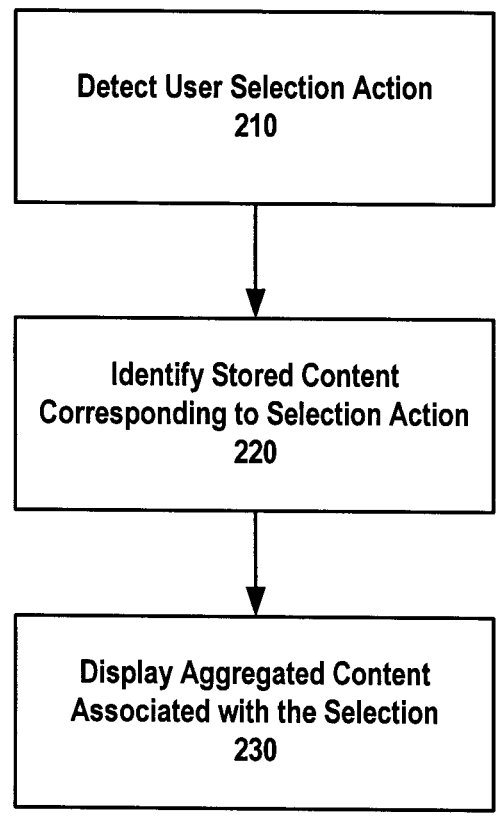
FIG. 2 is a method describing possible events resulting from a user interacting with a chronology display, according to an embodiment of the invention.

FIG. 2 is a method describing possible events resulting from a user interacting with a chronology display, according to an embodiment of the invention. In an embodiment, a method such as described with an embodiment of FIG. 2 may be implemented on a server that communicates with the terminal of a viewer. The server and terminal may communicate across the Internet or other networks. The viewer's terminal may operate a browser to view and interact with a webpage or presentation on which content items and the chronology display are presented.

A method such as described with an embodiment of FIG. 2 assumes that a webpage or other presentation is processed to archive the webpage with association to the chronology display. For example, as described with an embodiment of FIG. 1, an association between content items assigned to a webpage and the time interval when the content item was first assigned to the webpage, may be stored or archived for subsequent use.

Step 210 provides that the user interacts with the chronology display to indicate a selection of time period. The selection may be indicated by a selection action, which may be communicated through, for example, the viewer's web browser. The server may detect the selection action. The selection action may correspond to a user selecting (i.e. clicking) on a particular interval displayed on the chronology display. In one embodiment, each interval on the chronology display may be color coded or shaded so as to indicate the activity data corresponding to a particular category or search term. As an alternative or addition, each interval may also contain a character that is colored or shaded to indicate the activity data. Other alternative selection actions are possible. For example, the selection action may correspond to the user manually entering a date, or a range of dates, that corresponds to each interval.

When a selection action occurs, step 220 provides that stored content corresponding to the specified interval or range of intervals is identified. According to an embodiment, each interval has an associated interval identifier associating the interval with content items and other data stored in a database or storage medium. In response to the interval being selected, the interval identifier is used to retrieve the content items that were assigned to the page in the specified interval identifier. As described with, for example, an embodiment of FIG. 1, the time interval that individual content items are posted or displayed on individual webpages is recorded and stored, so that a query specifying a specific time interval may identify at least some content items that were displayed on the webpage in the interval.

In response to the selection action, step 230 provides that content is generated based on or corresponding to content items that were displayed or associated with the page on the particular time interval of the selection action. In one embodiment, the webpage is recreated in part or whole from the date of the selected time interval. As the content is being aggregated, the webpage may be modified or recreated to reflect the state of the page in the interval of the selection. This may correspond to displaying links, summaries of content items or actual content items as they appeared on the page of the selected time interval. In one implementation, the page is recreated to replicate its state on the date of the interval. However, other embodiments may display only information reflecting a state of the page, such as a listing of active or inactive links to content items that appeared on the date of the selection. As another example, the webpage may display content items from the selection date in a parsed or cached form, so that some richness or media is stripped from what was displayed either with the webpage or with content items provided through the page. In either implementation described, the state of the webpage (or other presentation) may be recreated or otherwise provided to the viewer with the selection of the interval identifier.

While an embodiment of FIG. 2 is described with reference to a webpage that is modified in time with new content items, one or more embodiments recognize that the webpage may actually change in identity or location. For example, the content items associated with a presentation may in fact be associated with a particular category. The webpage reflecting the category may be generated on-the-fly, or repeatedly over intervals of time. The webpage may also be provided a new network location or other identifier. As such, content items associated with a page or presentation may in fact only be associated with a category or other class designation, for which the chronology display is maintained.

System Description

Figure 3:
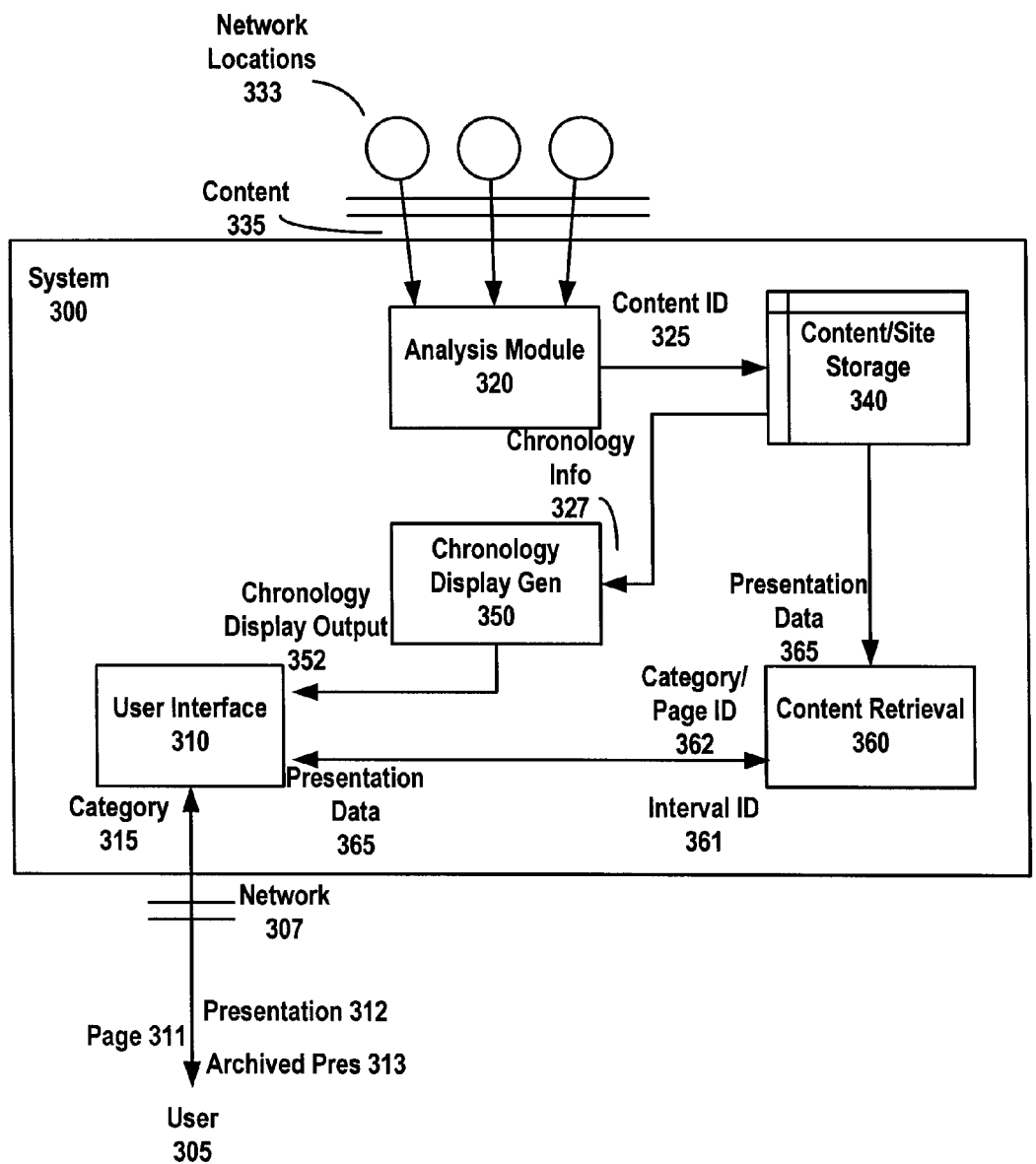
FIG. 3 illustrates a system for enabling generation of a selectable chronology display, for use with a web site that assigns content items to webpages, presentations or categories under an embodiment of the invention.

FIG. 3 illustrates a system for enabling generation of a selectable chronology display, for use with a web site that assigns content items to webpages, presentations or categories under an embodiment of the invention. According to one or more embodiments, a system such as described with an embodiment of FIG. 3 may be used to perform a method such as described with embodiments of FIG. 1 and FIG. 2.

In an embodiment, a system 300 includes a user interface 310, an analysis module 320, a content/site storage 340, a chronology display generator 350 and a content retrieval component 360. A system 300 such as described with an embodiment of FIG. 3 may be implemented on a server that is accessible by user terminals across the Internet. User interface 310 refers to software or processes on the server which communicate with the user's browser. The user-interface 310 may display or render webpages at a specific site or domain on which one or more embodiments are implemented. A user 305 may thus access, via a network connection 307, the system 300 by accessing the domain or website on which embodiments described herein are implemented. The user interface 310 enables the user 305 to navigate and select webpages from a website. The navigation and selection of webpages may be performed in any one of many ways, including by category selection or search. The user-interface 310 may enable the user to specify a particular page or category through any one of many mechanisms. For example, the user-interface 310 may provide a search interface and handle search terms, or process navigation input, for purpose of determining a particular page 311 or presentation 312 to render to the user 305. The user may navigate amongst a hierarchy of nodes within the website from which pages or other presentations may be generated. Alternatively, the user 305 may select a category 315 from a populated list or menu.

Analysis module 320 provides a back end for system 300, in that it may include various components for retrieving, analyzing, and assigning content items to webpages and/or categories or other designations of web presentations. To this end, the analysis module 320 may crawl for content items 335, which as mentioned, may correspond to news stories, blog postings or other text-based content provided at various network locations 333 on the Internet. Text from retrieved content items 335 may be analyzed programmatically and/or manually to designate a category or specific webpage for the content item based on the subject matter of the content item. In one embodiment, an identifier of the content item 325 is stored in a data structure 340, along with its category assignment(s) (or webpage assignments), and the date on which the content item 335 was provided on the online site. The identifier may locate the content item (e.g. it may correspond to a Uniform Resource Locator). However, as an alternative or addition, some or all of the content item (e.g. the file, or parsed text therefrom) may be stored in the data structure 340.

An embodiment contemplates that not all analyzed content items that are stored for each category or webpage are in fact displayed on the corresponding webpages. For example, duplicative news stories may be stored for a common category or webpage, but only one may be displayed. Thus, for any given webpage or category, only some assigned content items assigned to the given page or category may actually be displayed. In an embodiment such as shown by FIG. 4, each content item may be stored and associated with (i) its identifier and location (e.g. URL), (ii) an identifier of the category (or categories) and/or webpage that it is assigned to, and (iii) the time period or interval when the content item is displayed (if it is displayed) or assigned.

In an embodiment, chronology display generator 350 retrieves or procures chronology information 327 from data structure 340 to provide a chronology display 352 that is specific to a webpage or category. The chronology information 327 may correspond to a count or other analysis of individual content items that were either assigned to a category or to a particular page for a given interval of time. Because the data structure 340 may list the time period when individual content items were selected to appear with a webpage or with the presentation of a particular category, the time period for content items appearing with individual pages or categories may be counted, or compared against an average, or a moving average, or evaluated in some other way (e.g. increase or decrease in frequency). Other forms of analysis may also be performed in order to make a measurement of the activity level of the category or page. The chronology display generator 350 may operate independently for each page, so as to provide the chronology display output 352 with data structure 340 or otherwise in some retrievable form for combining with the presentation 312 created by the user-interface 310. Alternatively, the chronology display generator 350 may handle requests for individual pages or categories on-the-fly, as they are specified through user-interface 310.

Chronology output 352 may have any one of many forms. For example, it may be in the form of a timeline, weekly calendar or monthly calendar. It may also have active or selectable data elements, so as to enable the user to select a specific date or time interval from the display. Each of the selectable data elements may have a characteristic, such as for example, a color or shading that indicates a number of content items provided during each interval of the chronology display. The chronology display output 352 may be provided as part of the user-interface 310 generated for a given category or webpage.

In an embodiment, user-interface 310 handles inputs from the viewer 305, from which pages 311 or category presentations 312 are rendered. To identify content that is to be rendered for the particular page 311 or presentation 312, the user-interface 310 may query or call the content retrieval component 360 with the category or page identifier 362. The category or page identifier 362 may be used to retrieve page or presentation data 365 by identifying what content items are identified as being associated with the category or page identifier 362 in the data structure 340. The page or presentation data 365 may include (i) links to content items, (ii) text, pictures or content supplementing the content items (e.g. summaries or selected pictures), or (iii) the content from identified content items. Additionally, the page or presentation data 365 that is retrieved may match a criteria of being marked as current in its time interval, or otherwise being assigned within a recent or current time interval. The page/presentation data 365 is rendered to the user via the user-interface 310. The resulting content may display the page or other presentation, and may be category specific.

In one embodiment, the rendering of the page/presentation data 365 is combined with the chronology display output 352 for the page 311 or presentation 312. In an embodiment, the user-interface 310 may either query the chronology display generator 350 for generation of the display output 352, or identify the chronology display output 352 for the page 311 or presentation 312 that is stored or cached (e.g. within data structure 340).

The chronology display output 352 may be active or inactive, depending on implementation. As inactive, chronology display output 352 may simply display information, For example, chronology display output 352 may display a calendar with information that is indicative of the activity data for the rendered page 311 or presentation 312. If active, chronology display output 352 may include active, selectable data elements that enable the user to navigate and view content associated with the rendered page 311 or presentation 312, but from a previous date or interval. In an embodiment, user 305 may select one of the intervals (which may be active), which specifies an interval identifier 361. The content retrieval component 360 may then retrieve content from the data structure 340 based on the page 311 or presentation 312 being viewed, as well as the interval identifier 361 specified by the user's interaction with the chronology display output 352. As an alternative to identifying the page, the category or other attribute of the page may be identified in connection with the interval identifier 361.

In an embodiment of FIG. 3, the inclusion of the interval identifier 361 results in the retrieved page or presentation data 365 (i) matching content items that have category or webpage assignment of the page on which the chronology display output 352 is generated, and (ii) being associated with a time interval that matches or corresponds to the interval identifier 361 (as opposed to the current or most recent interval when the chronology display output 352 is not used). An archived presentation 313 may result via interface 310, displaying (i) the webpage (or corresponding webpage for the same category) in a past state of the specified interval, (ii) a listing or display of at least some of content items, with or without active links to those content items, for some of the content displayed in the designated time interval, (iii) a derivation of the past content items or content therefrom, such as a parsed text-only view of portions of content items from the stated interval.

Data Structure

FIG. 4 illustrates a data structure for storing data indicative of one or more network locations from which content is procured according to an embodiment of the invention. According to one or more embodiments, a data structure such as described with embodiments of FIG. 4 may be used in a system such as described in FIG. 3, or used to perform a method such as described with embodiments of FIG. 2.

In an embodiment, data structure 400 may be configured to categorically store data corresponding to content items 335 (FIG. 3) procured from various network locations 333. The categories of the stored data may include (i) category/webpage data 410 corresponding to data that indicates the category (or categories), the webpage, and/or the presentation of a particular content item, (ii) content URL data 420 corresponding to the actual link or URL of the webpage from which the data was procured, (iii) content text data 430 corresponding to the text contained on the webpage, (iv) content picture data 440 corresponding to pictures and objects, other than text, contained on the webpage, and (v) interval data 450 that indicates the time period or interval of when the webpage was originally provided on the network location.

According to an embodiment, data stored in each category is associated with data from each of the other categories according to the webpage from which the data originated. For example, data corresponding to Category B stored in category/webpage 410 is associated with its URL (URL #2), text data (<Text>), picture data (<Picture>), and interval (Interval

2) stored in content URL 420, content text 430, content picture 440, and interval data 450 respectively.

In an embodiment, data structure 400 may be configured to provide data to various components in system 300 in response to requests for data. The requests may correspond to a particular category being selected by a user or a particular interval being selected on the chronology display. For example, a user may select a particular interval, Interval #3, on the presented chronology display. In response, data corresponding to Webpage A, URL #3, and the associated text (<Text>) and picture (<Picture>) data is retrieved from the data structure 400 and provided to one or more components of system 300 and presented to the user.

In another embodiment, a request may be made for a particular interval, and in response to the request, data corresponding to more than one interval may be provided. For example, if a request is made for data corresponding to interval #4, data corresponding to intervals occurring before interval #4 (e.g. intervals #1, #2, and #3) may also be provided. The data may be used to populate a chronology display that may then be rendered to a user. Thus, the number of stories for "Interval 1" and so forth may be counted. Information in the form of color or numbers may be used to show on the chronology display the number of content items that were posted or made available for display during a given interval.

Chronology Display

Figure 5A:
FIGS. 5A-5C show examples of a chronology display being rendered on a webpage according to one or more embodiments of the invention.
Figure 5B:
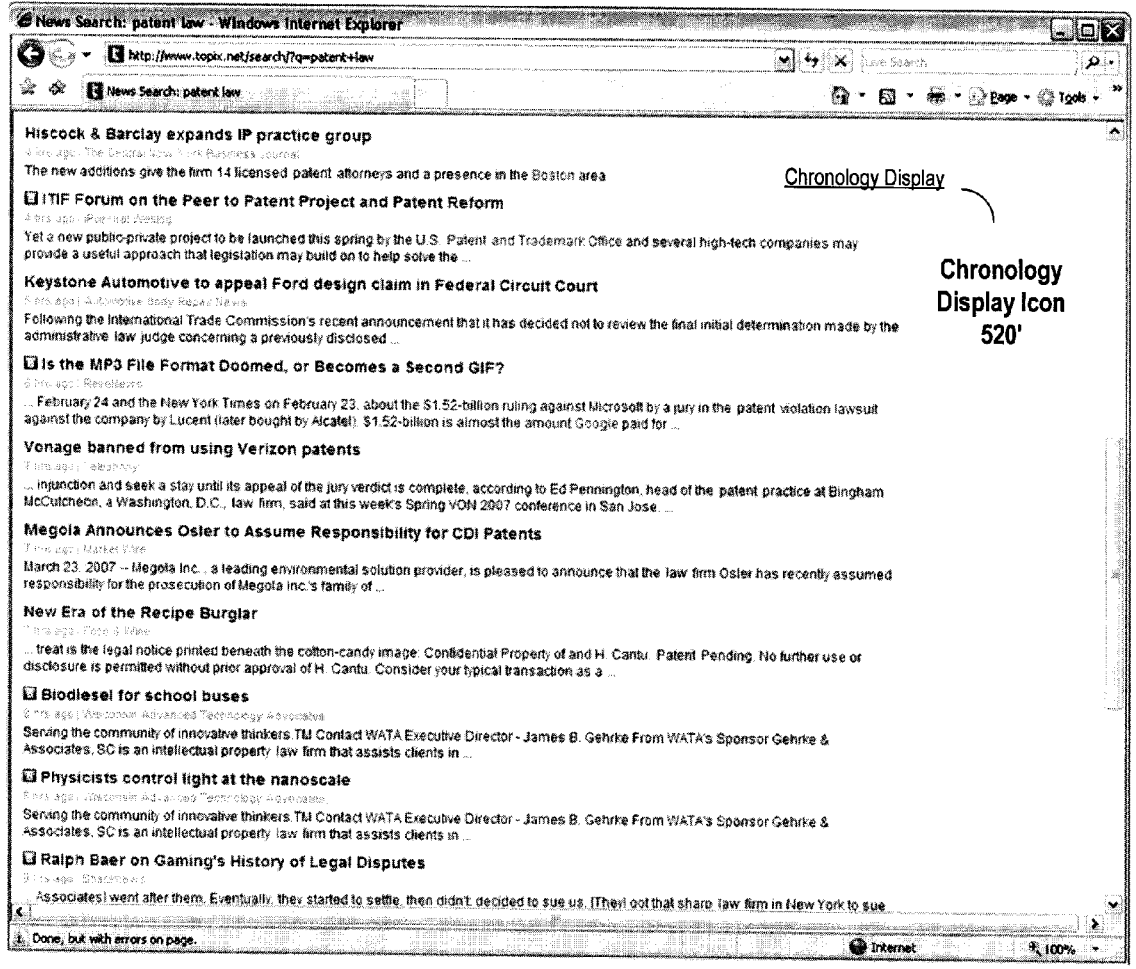
Figure 5C:
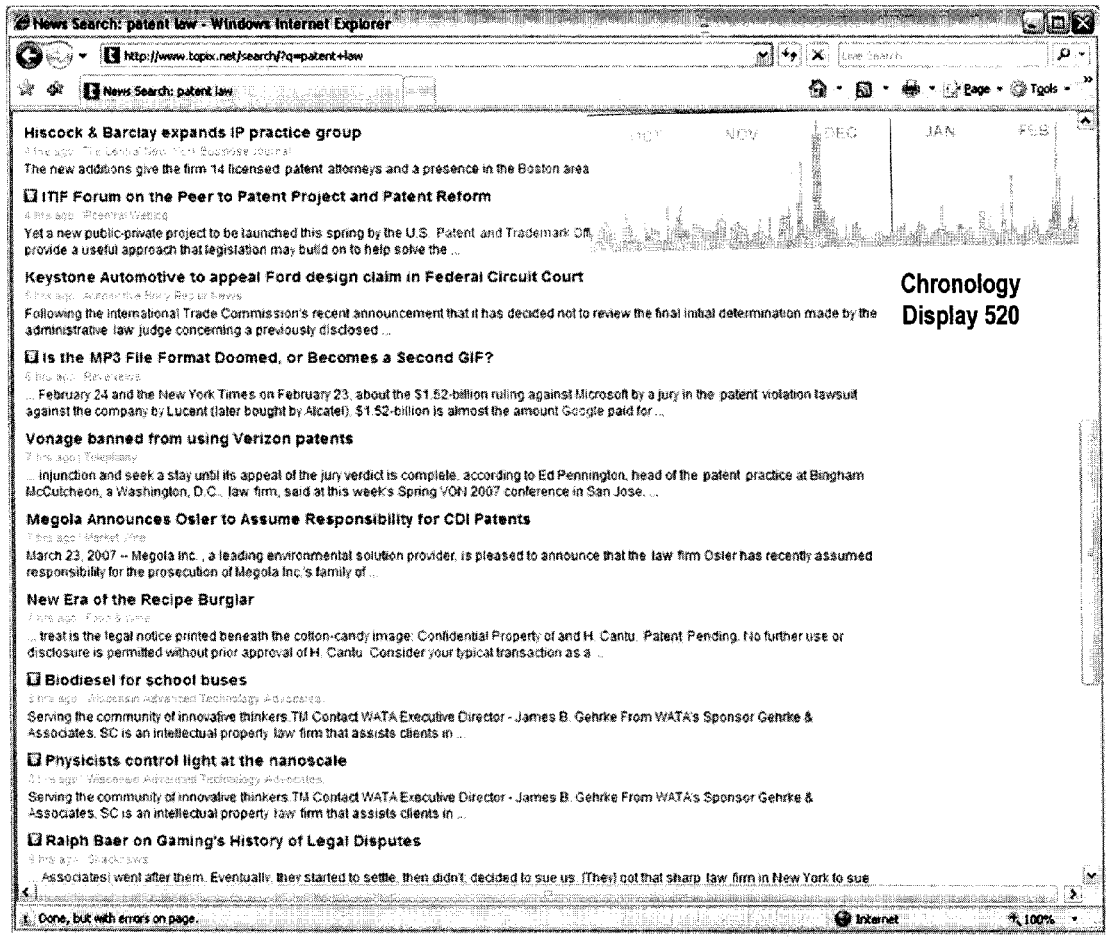

FIGS. 5A-5C show examples of a chronology display being rendered on a webpage according to one or more embodiments of the invention.

According to an embodiment of FIG. 5A, the chronology display 510 is in the form of a calendar with a plurality of intervals (i.e., days of the week, month etc.). Each day (i.e. interval) of the calendar is active to be selectable, and/or color coded, shaded or otherwise marked to indicate a count or measure of the number of content items that appear on the page during each day. In an embodiment, the calendar may be configured so as to allow a user to scroll through previous months, with each day of each month displaying the activity data corresponding to the selected category.

According to another embodiment of FIG. 5B, the chronology display may be combined or hidden with an object 520', such as an image, icon, link, and/or a text word. In response to a selection being made, the chronology display may be rendered to the user. For example, an icon may be provided as the object 520', and when selected. A chronology display such as shown and described with FIG. 5A may be displayed.

In another embodiment of FIG. 5C, the chronology display 520 may be in the form of a timeline. As with the calendar, the timeline displays activity data to the user. The timeline may be divided into various intervals with each interval being color coded and selectable. One or more embodiments further contemplate an ability for a user to toggle or select Alternative Embodiments While embodiments described above provide for the chronology display to list indications regarding the frequency of newly added content, the chronology display may provide other information relating to the inclusion of content items. For example, the chronology display may indicate the number of stories or content items that were edited by viewers or designated viewer-editors of the site, or the combination of stories that were edited and newly added.

In alternative embodiment, the chronology display may display the number of times a particular category or key word was searched. In response to a selection action, content corresponding to the category or key word may be rendered to the user. In yet another embodiment, the chronology display may display the number of times viewers posted comments about a particular story or content item.

In an alternative embodiment, category ID 362 may be specified by a user 305 and not correspond to category 315 thereby allowing a user to generate a chronology display 352 when a network location is first accessed.

In an alternative embodiment, the chronology display may be configured to display activity data that occurs on blog sites and message boards and can store data corresponding to any number of postings or comments. In such an embodiment, the interval data assigned to each posting or comment may correspond to the date and/or time each was posted, and a corresponding chronology display generated. Moreover, embodiments described herein may extend to content posted or selected to appear on any webpage without categorization designation.

CONCLUSION

Although illustrative embodiments of the invention have been described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. This, the absence of describing combinations should not preclude the inventor from claiming rights to such combinations.

What is claimed is:

1. A method for providing content, the method being performed by one or more processors and comprising:
   generating an online resource comprising content arranged in a plurality of categories;
   for a particular category in the plurality of categories, generating a presentation including a plurality of content items that have been (i) retrieved from one or more network sources, and (ii) identified as corresponding to the particular category;
   generating, with the presentation, a chronology display corresponding to the particular category for the presentation, the chronology display (i) including a plurality of time intervals, and (ii) for at least some of the plurality of time intervals, indicating a number of content items posted to the online resource corresponding to the particular category during a respective time interval; and
   wherein the chronology display is provided in a designated region of the presentation.

2. The method of claim 1, wherein the plurality of content items corresponds to at least one of a news article, a story, a blog, a journal entry, or a message board entry.

3. The method of claim 1, wherein the plurality of content items are identified as corresponding to the particular category based on one or more terms corresponding to the particular category that are found in text of the plurality of content items.

4. The method of claim 1, wherein generating the chronology display with the presentation includes enabling at least some of the plurality of time intervals to be selectable.

5. The method of claim 4, further comprising:
   detecting a user selection of at least one of the time intervals of the chronology display that is selectable, the user selection being provided by a remote computing device of a user; and
   in response to detecting the user selection of the selectable time interval, generating information about the selected time interval.

6. The method of claim 5, wherein generating information about the selected time interval includes regenerating a presentation that includes a set of content items that have been previously provided on the online resource during the selected time interval.

7. The method of claim 1, wherein the presentation and the chronology display are provided over a network to a browser application on a remote computing device.

8. The method of claim 7, wherein a user operating the browser application on the remote computing device is enabled to interact with the presentation and the chronology display in order to select a feature to hide the chronology display.

9. The method of claim 1, wherein the chronology display is a calendar, and wherein each of the plurality of time intervals corresponds to at least one of a day, a week, or a month.

10. The method of claim 1, wherein the chronology display is a timeline.

11. A non-transitory computer readable medium storing instructions that, when executed by one or more processors, cause the one or more processors to perform steps comprising:
   generating an online resource comprising content arranged in a plurality of categories;
   for a particular category in the plurality of categories, generating a presentation including a plurality of content items that have been (i) retrieved from one or more network sources, and (ii) identified as corresponding to the particular category;
   generating, with the presentation, a chronology display corresponding to the particular category for the presentation, the chronology display (i) including a plurality of time intervals, and (ii) for at least some of the plurality of time intervals, indicating a number of content items posted to the online resource corresponding to the particular category during a respective time interval; and
   wherein the chronology display is provided in a designated region of the presentation.

12. The non-transitory computer readable medium of claim 11, wherein the plurality of content items corresponds to at least one of a news article, a story, a blog, a journal entry, or a message board entry.

13. The non-transitory computer readable medium of claim 11, wherein the plurality of content items are identified as corresponding to the particular category based on one or more terms corresponding to the particular category that are found in text of the plurality of content items.

14. The non-transitory computer readable medium of claim 11, wherein the instructions further cause the one or more processors to generate the chronology display with the presentation to enable at least some of the plurality of time intervals to be selectable.

15. The non-transitory computer readable medium of claim 14, wherein the instructions further cause the one or more processors to:
   detect a user selection of at least one of the time intervals of the chronology display that is selectable, the user selection being provided by a remote computing device of a user; and
   in response to detecting the user selection of the selectable time interval, generate information about the selected time interval.

16. The non-transitory computer readable medium of claim 15, wherein the instructions further cause the one or more processors to generate information about the selected time interval by regenerating a presentation that includes a set of content items that have been previously provided on the online resource during the selected time interval.

17. The non-transitory computer readable medium of claim 11, wherein the presentation and the chronology display are provided over a network to a browser application on a remote computing device.

18. The non-transitory computer readable medium of claim 17, wherein a user operating the browser application on the remote computing device is enabled to interact with the presentation and the chronology display in order to select a feature to hide the chronology display.

19. The non-transitory computer readable medium of claim 11, wherein the chronology display is a calendar, and wherein each of the plurality of time intervals corresponds to at least one of a day, a week, or a month.

20. The non-transitory computer readable medium of claim 11, wherein the chronology display is a timeline.

* * * * *